United States Patent
Elorriaga

(12) 
(10) Patent No.: US 6,192,671 B1
(45) Date of Patent: Feb. 27, 2001

(54) CROSS BAR CENTERING MECHANISM FOR SLAVE PETALS IN COVERGENT DIVERGENT NOZZLES WITH VARIABLE GEOMETRY

(75) Inventor: Javier Elorriaga, Getxo (ES)

(73) Assignee: Industria de Turbo Propulsores, S.A., Zamudio (Vizcaya) (ES)

( * ) Notice: Subject to any disclaimer, the term of this patent is extended or adjusted under 35 U.S.C. 154(b) by 0 days.

(21) Appl. No.: 09/139,295

(22) Filed: Aug. 25, 1998

(30) Foreign Application Priority Data

Aug. 28, 1997 (EP) .................................. 97500147

(51) Int. Cl.[7] .................................. B64C 15/06
(52) U.S. Cl. .................. 60/230; 60/228; 239/265.36; 239/265.41
(58) Field of Search .................. 60/228, 230, 271; 239/265.11, 265.19, 265.33, 265.35, 265.37, 265.39, 265.41

(56) References Cited

U.S. PATENT DOCUMENTS

| | | | |
|---|---|---|---|
| 5,232,158 | * 8/1993 | Barcza | 60/230 |
| 5,269,467 | * 12/1993 | Williams et al. | 60/230 |
| 5,484,105 | 1/1996 | Ausdenmoore et al. | 239/127.3 |
| 5,485,959 | * 1/1996 | Wood et al. | 60/250 |
| 5,680,755 | * 10/1997 | Hauer et al. | 60/230 |

FOREIGN PATENT DOCUMENTS

| | | |
|---|---|---|
| 595 753 A1 | 5/1994 | (EP) . |
| 687 810 A2 | 12/1995 | (EP) . |

\* cited by examiner

*Primary Examiner*—Charles G. Freay
(74) *Attorney, Agent, or Firm*—Darby & Darby

(57) ABSTRACT

Divergent petal arrangement for convergent-divergent nozzles with thrust vectoring capability through changes in the divergent section geometry, in which the position of each slave divergent petals 4 is determined by a centering mechanism 31, made up by two centering bars 14 and 27 that slide across the sled elements 17 and 18 of the master divergent petals 2, fix a centered axial position between divergent master petals 2 and by a hanger element 13 that collides with the stop elements 25 of the master divergent petals limits the displacement to another axial position, avoiding at the same time and in conjunction with the centering mechanism 31 the displacement of the slave divergent petal 4 away from the master petals 2 when the pressure forces act from the air towards the gas side.

2 Claims, 4 Drawing Sheets

US 6,192,671 B1

CROSS BAR CENTERING MECHANISM FOR SLAVE PETALS IN COVERGENT DIVERGENT NOZZLES WITH VARIABLE GEOMETRY

FIELD OF THE INVENTION

The scope of the present invention is a divergent petal arrangement in convergent-divergent nozzles with thrust vectoring capability.

BACKGROUND OF THE INVENTION

Many of the existing military aircraft are equipped with convergent divergent nozzles. These can optimize the thrust for different flying conditions by varying the nozzle throat and exit area.

The manoeuvering capability of the aircraft together with the flying envelope can be enhanced by providing the aircraft with the capability of vectoring the thrust by introducing a component perpendicular to the engine axis. Thrust vectoring can be achieved with a change in the geometry of the divergent nozzle section with the convergent section remaining axisymmetric.

One of the possible arrangements for the divergent sections consists of a number of master petals positioned circumferentially around a conical section. Slave petals are positioned closing the gaps between each two of the master petals on the internal side of the conical surface. Engine gas pressure pushes the slave petals against the master petals providing adequate sealing.

The position of the slave petals between master petals must avoid disengagement or circumstance in which the sides of a master and slave petal cross allowing a gas exit. Slave petals must also be capable to deflect through flexion and/or torsion to adapt their sides to the gas side surfaces of the master petals, guaranteeing proper sealing.

The position of the master divergent petals can be determined by an actuation system consisting of hydraulic actuators, an actuation ring and different struts that connect each of the master divergent petals to the actuation ring. For a given position of the actuators and throat area the opening and vectoring degree of the divergent section is determined.

The slave petals are positioned radially by the engine gas pressure and the reaction against the master petals. The circumferential and axial position of each petal is determined by a centering mechanism that can be connected to the convergent section and the adjacent master petals. The mentioned mechanism must guarantee a centered position for both axisymmetric and vectored configurations. The system must also be compatible with the torsion and flexion of the slave petal.

Hangers must avoid the displacement of the slave petal away from the master petals when the gas pressure is less than the outer cavity pressure on the air side of the petal. This condition is encountered for large divergence angles at determined points of the flying envelope.

SUMMARY OF THE INVENTION

The present invention consists of a centering mechanism for divergent slave petals which reduces the numbers of parts compared to other known solutions. The mechanism also avoids the need of one of the hangers to withstand the forces that result from pressure acting on the air side of the petal. The mechanism is also capable of withstanding axial forces and therefore allows the removal of the joint between convergent and divergent slave petals.

The present invention consists of a support element joint on the air side of the slave divergent petal to which two centering bars are attached, preferably by spherical joints to accommodate the changes in angle. Each of the centering bars has two grooves that extend from their central position to the sides.

The master divergent petals have two sled elements on each side. Two sleds on opposite sides of the petal are forward sleds, characterized by being located closer to the throat area than the rear sleds, which stand nearer to the nozzle exit area. Each of the sled elements slides through a groove on one of the centering bars.

The centering bars join the left sleds of the master divergent petal located at the right of the slave divergent petal with the right sleds of the master divergent petal located at the left of the mentioned slave petal. The bars cross each other such that each of the two joins a front sled of one master petal with the rear sled of the other petal. The position of the support of the slave divergent petal is determined by the crossing of the two centering bars.

If the pressure difference on the sides of the slave divergent petal results on a net force towards the gas side of the petal, one of the two centering bars contacts the air side of the adjacent master petals limiting the displacement of the slave petal and holding it at an adequate position.

In a different axial position to the one of the support of the centering bars and preferably close to the exit area, there is a second support element joined to the slave divergent petal on the air side. A hanger element with two grooves that extend from its center to the sides, is joined preferably by a spherical joint, to the second support element. A stop element, which is allowed to move freely though the interior of one of the grooves in the hanger, is attached to the master petals, in a similar way to the sleds. The stop elements only contact the sides of the grooves when achieving a limit offset from the centered position.

The purpose of the described hanger element is to limit the displacement towards the gas side when the pressure on the air side of the slave divergent petal is higher than the pressure on its gas side and to limit the offset from the centered position at the corresponding axial location, avoiding any disengagement for maximum opening of the nozzle and collision of the slave petals for minimum opening of the nozzle.

These main advantages and other features and benefits will be more easily understood in the following description together with the appended drawings, in which the arrangement of the centering mechanism according to the principles of the invention, has been represented over the divergent petals as a non limiting example.

DETAILED DESCRIPTION OF THE PREFERRED EMBODIMENTS

Figure 1:
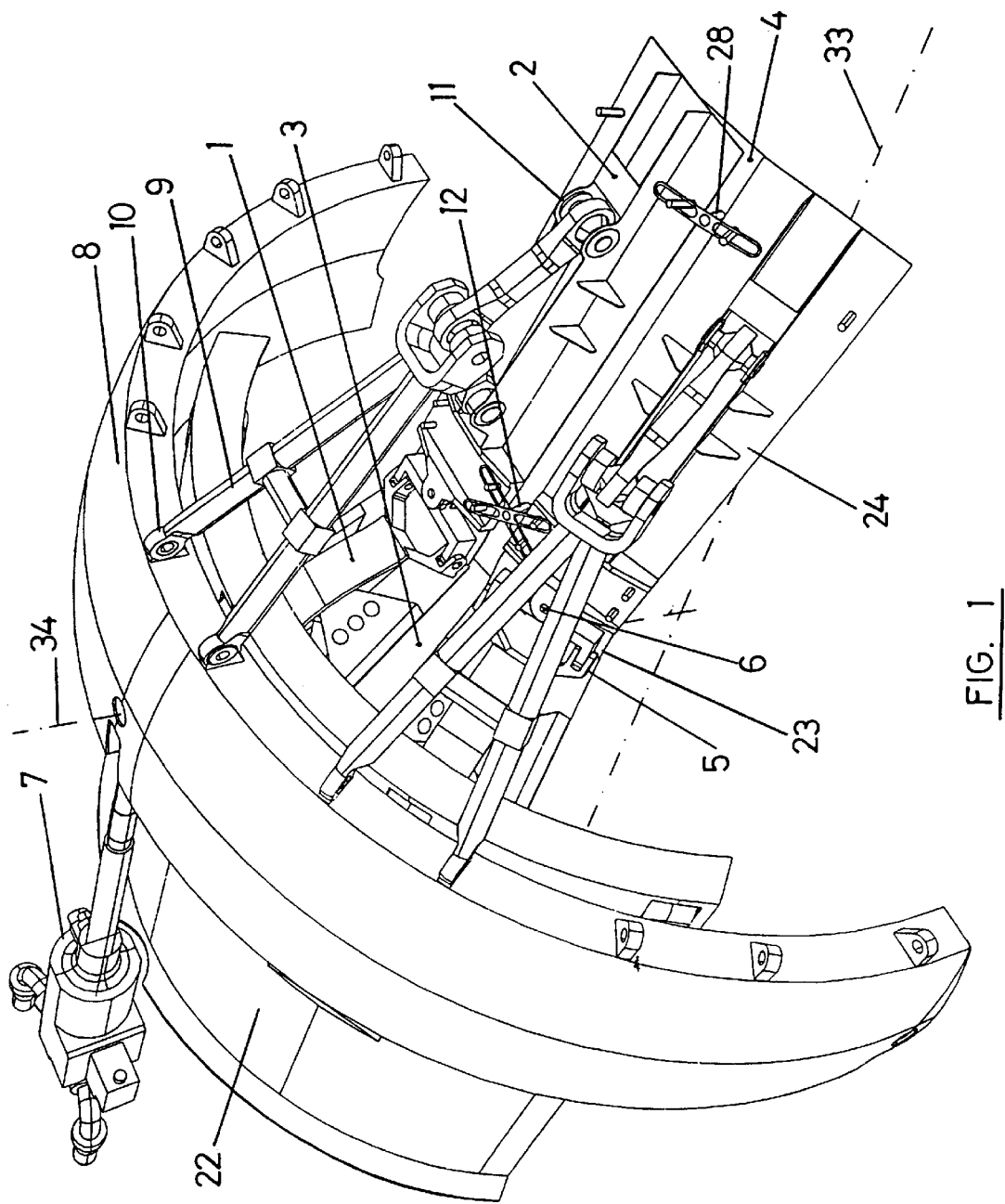
FIG. 1 represents a partial cut-away perspective of a convergent divergent nozzle, showing the convergent and the divergent section which includes the centering mechanism/hanger element. Some of the elements have been omitted for clarity.

FIG. 1 represents an arrangement of a convergent-divergent nozzle showing the master convergent petals 1 and the master divergent petals 2. The slave convergent petals 3 are located between the master convergent petals 1 and the slave divergent petals 4 are located between the master divergent petals 2.

The position of the master convergent petals 1 and the slave convergent petals 3 is determined by conventional mechanisms that can therefore select the nozzle throat area.

The position of the master divergent petals 2 is determined by the position of the master convergent petals 1 and actuation mechanism 7, joined to the casing 22. The position of the actuation system 7 determines the position of the actuating ring or semi-ring 8 which can move parallel to the engine axis 33 and rotate around a radial axis 34. The struts 9, which are joined at one side to the actuating ring 8 by a cylindrical joint 10 and on their other side to the gas side of the master divergent petal 2 by a spherical joint 11, determine the position of the master divergent petals 2 for each position of the master convergent petals 1.

The master divergent petal 2 consists of a front section 23 joined to the convergent master petal 1 by a cylindrical joint 5, determining the divergence angle of the master divergent petal 2. The front side 23 is joined to the rear side 24 by a cylindrical joint 6, determining the yaw angle of the master divergent petal 2.

The sleds 17 and 18 and the stop element 25 are joined to the master divergent petal 2 at the air side. The sleds 17 and 18 slide though the grooves 26 of the centering bars 14 and 27 which build up the centering mechanism 31. Each centering bar 14 and 27 has two grooves 26 that join a forward sled 18 of a divergent master petal 2 with a rear sled 17 of the neighbor divergent master petal 2.

The centering bars 14 and 27 aye joined with the support 12 of the slave divergent petal 4 preferably by a spherical bearing 19 which is held in position by a threaded joint 20. The support 12 is joined to the slave divergent petal 4 from the air side, preferably at an axial position close to the nozzle throat area. The support 12 is positioned at the crossing between bottom 27 and top 14 bars, centering the slave divergent petal 4 between the sides of the divergent master petals 2 and providing the adequate axial position.

Figure 2:
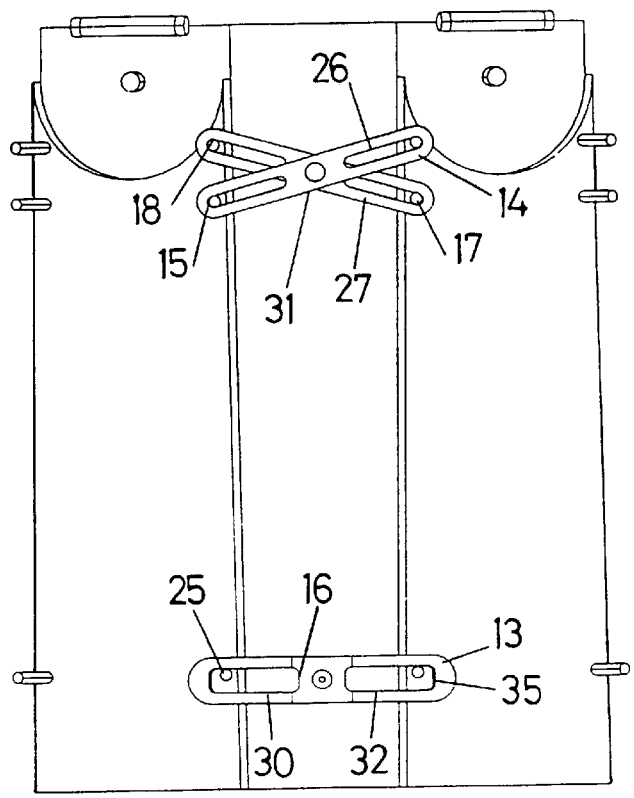
FIGS. 2–5 represent the positions of the centering mechanism/hanger element for maximum and minimum opening of the nozzle and axisymmetric and vectored arrangements.

FIG. 2 shows the position of the centering bars 14 and 27 for an axisymmetric nozzle arrangement with maximum opening. The forces that try to move the slave divergent petal 4 away from the centered position are transmitted through the centering bars 14 and 27 to the sleds 17 and 18 on the master divergent petal 2. The lateral force on the master divergent petal 2 is transmitted though the struts 9 to the actuating ring 8 and to the engine casing 22. In the case of failure of one of the centering bars 14 or 27 or of one of the sleds 17 or 18, one of the sleds contacts the centering bar at the end 15 of the groove 26, allowing only small fluctuations around the centered position and avoiding the risk of disengagement or crossing between the sides of the master and slave divergent petals 2 and 4.

Figure 3:
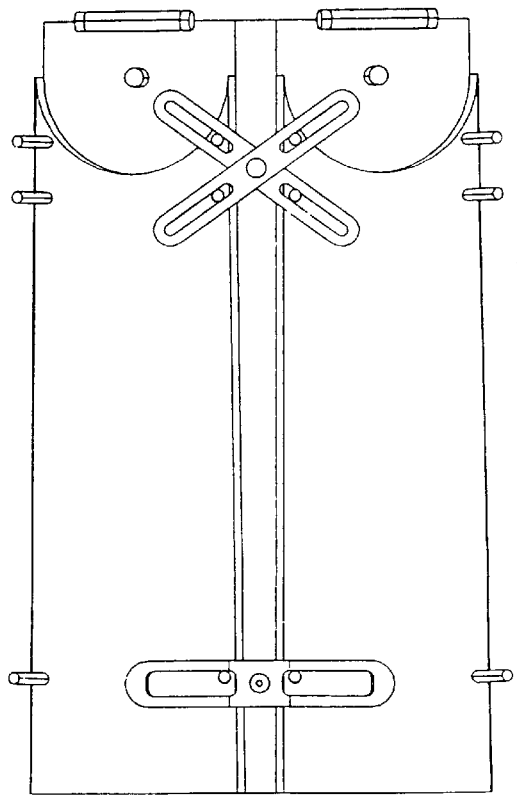

FIG. 3 shows the positions of the centering bars 14 and 27 for an axisymmetric nozzle arrangement with minimum opening. The forces that try to move the slave divergent petal 4 away from the centered position are transmitted to the sleds 17 and 18 through the sides of the groove 26.

Figure 4:
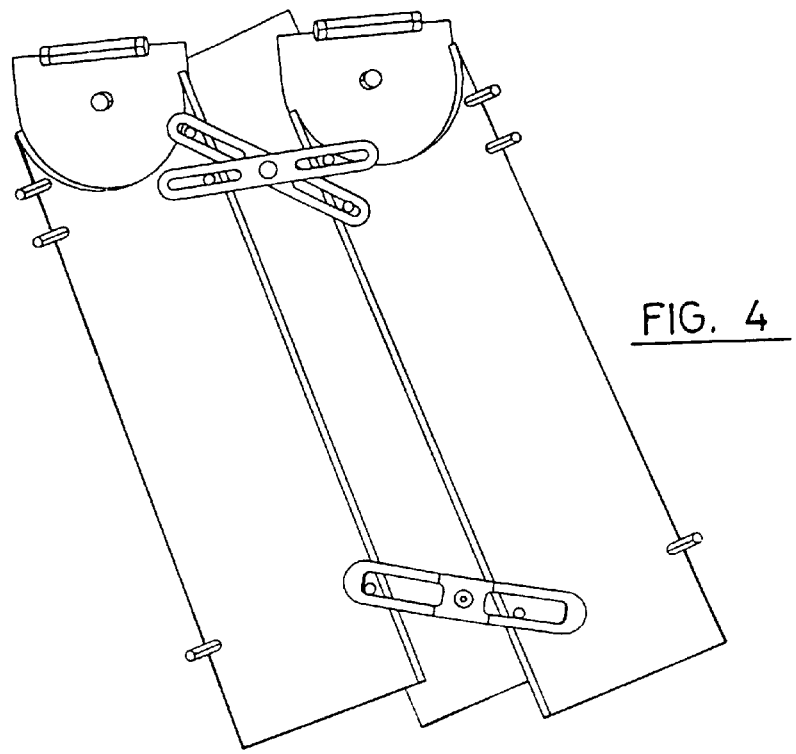
Figure 5:
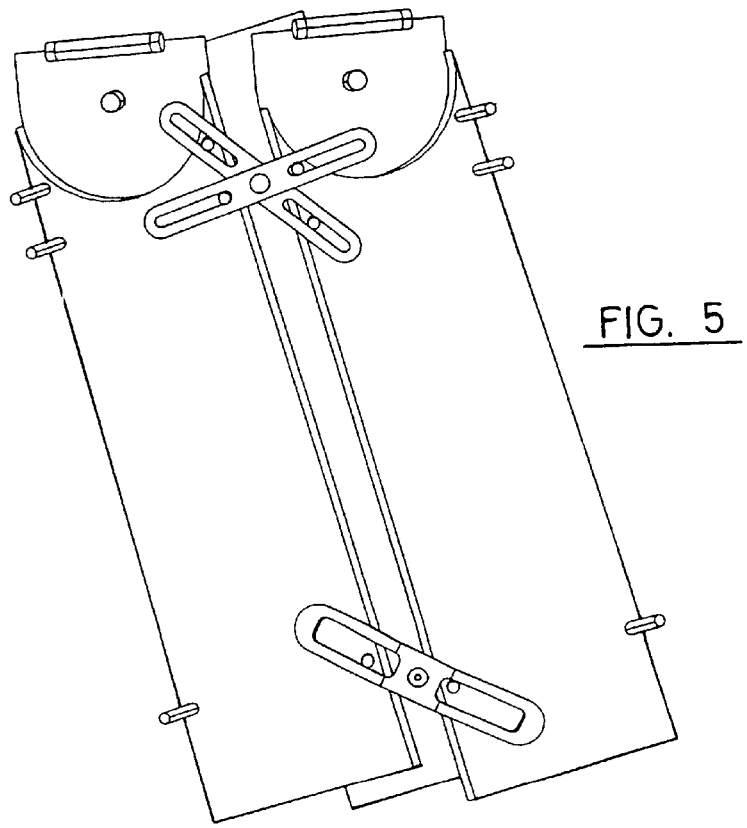
Figure 6:
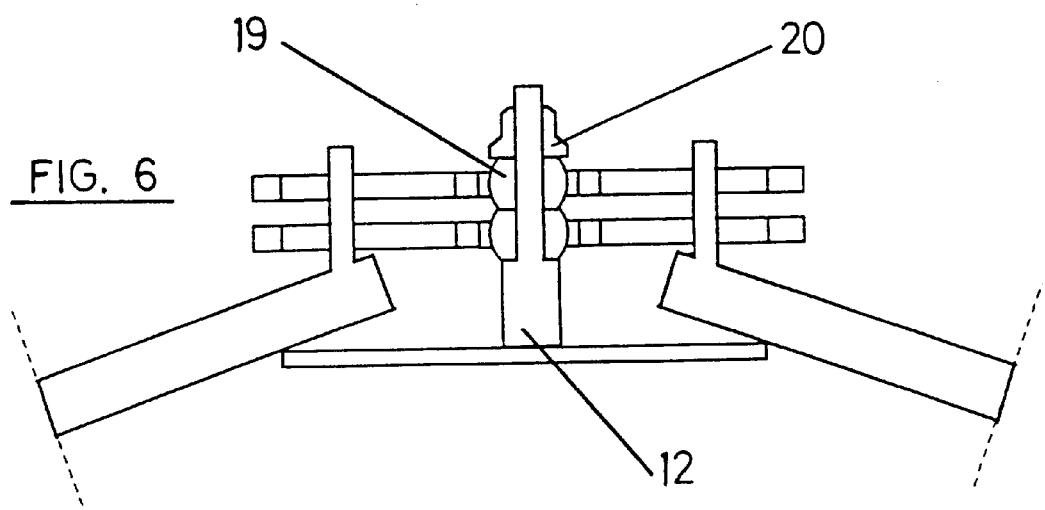
FIGS. 6 and 7 represent the elements on the centering mechanism and hanger element together with the preferred joint arrangements.
Figure 7:
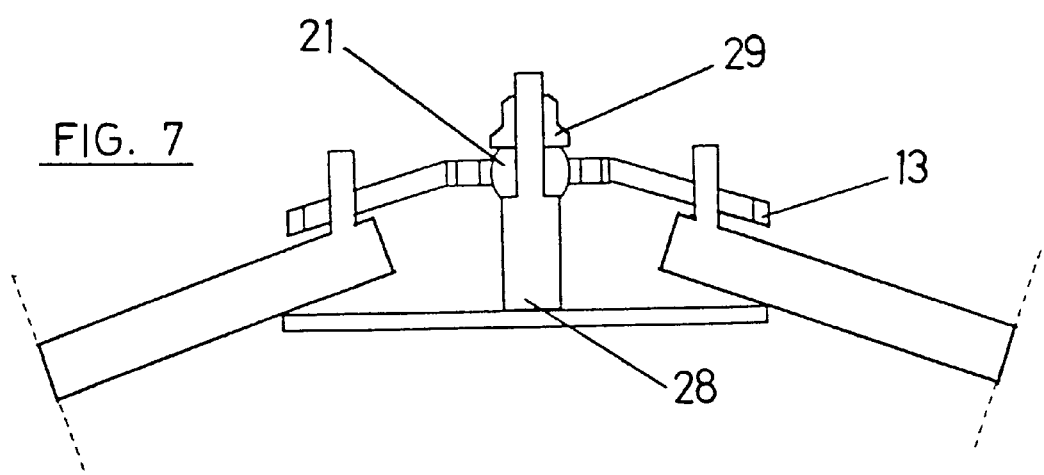

FIGS. 4 and 5 show the position for the centering bars 14 and 27 for vectored nozzle arrangements with maximum and minimum openings.

If the pressure of the engine gases is larger than the air side pressure, the slave divergent petal 4 is supported against the master divergent petals 2. If the air side pressure is larger than the gas pressure, the slave divergent petal 4 moves away from the master divergent petals 2 up to a position in which the lower centering bar 27 contacts the master divergent petal 2 avoiding further movement of the slave divergent petal 4 towards the gas side.

A hanger element 13, similar to the centering bars 14 and 27 is joined to a support element 28 located on the air side of the slave divergent petal 4 at an axial position preferably closer to the divergent exit area. The joint between the hanger 13 and the support 28 is done preferably by a spherical joint 21 retained by a threaded bolt 29.

The hanger element 13 has two grooves 30 through which the stop elements 25 are allowed to move. The diameter of the stop elements 25 is smaller than the width of the grooves 30 in order to avoid any interference with the axial positioning of the slave divergent petal 4, which is determined by the centering mechanism 31.

For vectored positions such as the one shown in FIG. 5, the offset from the centered position of the axial location of the hanger element 13 is limited by contact between the stop elements 25 and the sides 32 of the groove 30.

For maximum area nozzle arrangements, the risk of disengagement between master divergent petals 2 and slave divergent petals 4, is eliminated by limiting the maximum offset from the centered position with the outer side 35 of the groove 30. For minimum area nozzle arrangements, the risk of collision between slave petals is eliminated by the inner side 16 of the groove 30.

Thus, it can be seen that the preferred embodiments achieve the objectives and advantages of the invention. It is to be understood that the above embodiments are shown and described for the purpose of illustration, not for limitation. Variations in the embodiments may be made without departing from the invention, the invention being limited only by the claims, as follows.

What is claimed is:

1. A divergent petal arrangement for convergent-divergent nozzles with thrust vectoring capability for aircraft engines, which comprises a number master divergent petals joined to master convergent petals and to an actuation ring through a plurality of struts, and a number of slave divergent petals, each slave petal being mounted between two master divergent petals through a centering mechanism, wherein the centering mechanism comprises two centering bars, whose axis are coincident with two slots that run from the center to the sides and are orientated as the diagonals of a quadrilateral whose corners are sled elements located on the master petal sides at two different axial locations at the respective front end of a divergent petal, such that the crossing between the centering bars determines the position of the slave petal support, connected through a spherical joint to the bars, which is centered between master divergent petals and at an adequate position along the petal axis.

2. The arrangement according to claim 1, wherein a support on the slave divergent petal back side at an axial position along the petal axis, which stands closer to the exit side of the petal than the support of the centering mechanism, is connected through a spherical joint to a hanger element that selectively contacts the master petal at its back side and which incorporates two slots that extend from the hanger center to the sides, such that lateral displacements of the petal rear end are limited by the collision of one of the slots external end on a stop element located on the neighbor master divergent petal side at the same axial station as the support, thereby allowing the petal to position itself between opposite limits, as a result of the centered position at the front end and the gas forces acting from the gas side towards the air side, and guaranteeing the correct position of the slave divergent petals against disengagement and the radial displacement away from the master divergent petal under gravitational forces and pressure forces on the divergent section acting from the air side towards the gas side.

* * * * *